United States Patent [19]

Karbo

[11] 4,301,992
[45] Nov. 24, 1981

[54] DIAPHRAGM VALVE

[75] Inventor: Richard S. Karbo, Newport Beach, Calif.

[73] Assignee: Hydro-Rain Inc., Laguna Niguel, Calif.

[21] Appl. No.: 100,935

[22] Filed: Dec. 6, 1979

[51] Int. Cl.³ .................... F16K 31/12; F16K 31/385
[52] U.S. Cl. ..................................... 251/46; 251/30; 251/367
[58] Field of Search .................. 251/46, 30, 367; 137/527, 527.2

[56] References Cited

U.S. PATENT DOCUMENTS

| 197,226 | 11/1877 | Rodier | 137/527.2 |
|---|---|---|---|
| 2,155,400 | 4/1939 | Cominiti | 137/68 |
| 2,686,034 | 8/1954 | Rabal | 251/46 |
| 2,876,981 | 3/1959 | McNown | 251/46 |
| 3,022,039 | 2/1962 | Cone et al. | 251/46 |
| 3,476,353 | 11/1969 | Stampfli | 251/46 |
| 4,058,287 | 11/1977 | Fromfield | 251/46 |
| 4,132,237 | 1/1979 | Kennedy et al. | 137/75 |
| 4,135,696 | 1/1979 | Sacrem et al. | 251/30 |
| 4,136,711 | 1/1979 | Rubin et al. | 137/414 |
| 4,206,901 | 6/1980 | Williams | 251/35 |
| 4,226,259 | 10/1980 | Szelcely et al. | 137/269 |

FOREIGN PATENT DOCUMENTS 56724  6/1944  Netherlands ................ 137/527.2

Primary Examiner—A. Michael Chambers
Attorney, Agent, or Firm—Gordon L. Peterson

[57] ABSTRACT

A diaphragm operated valve including a valve housing having a passage extending therethrough with an inlet and an outlet and a cavity communicating with the passage. A diaphragm extends across the cavity to define a control chamber on one side of the diaphragm. The other side of the diaphragm communicates with the passage. A passageway in the valve housing leads to the control chamber so that the pressure in the control chamber can be varied. A diaphragm support having an opening therein is mounted in the cavity to support the diaphragm, and a vlave element is pivotally mounted within the valve housing for cooperation with the valve seat. The valve seat forms an acute angle with the axis of the passage through the valve housing to minimize pressure losses.

10 Claims, 4 Drawing Figures

U.S. Patent  Nov. 24, 1981  4,301,992
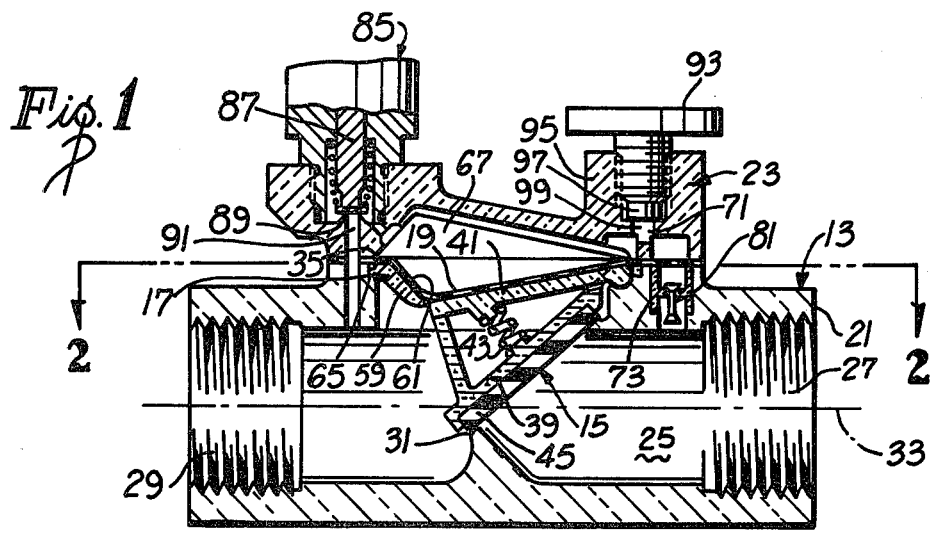
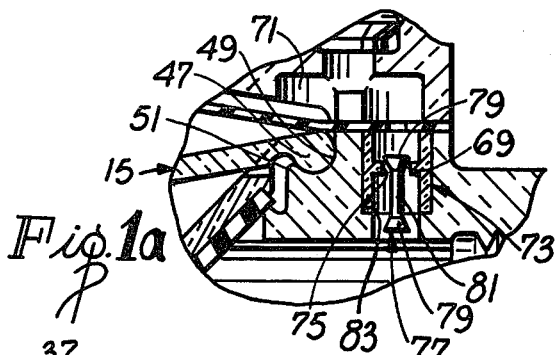
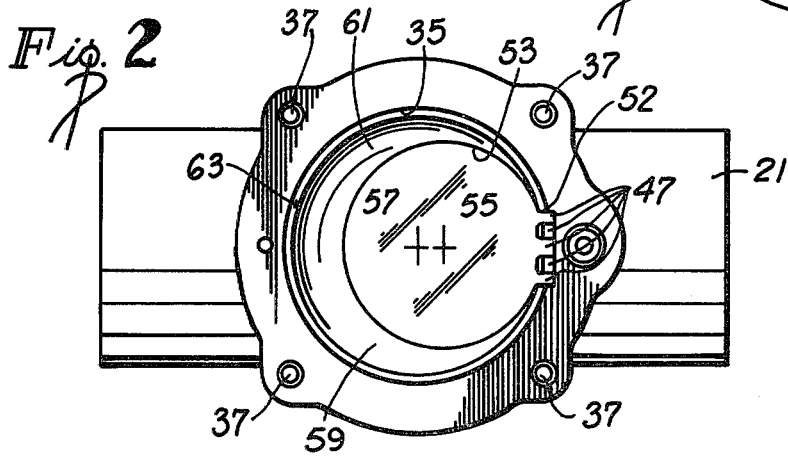
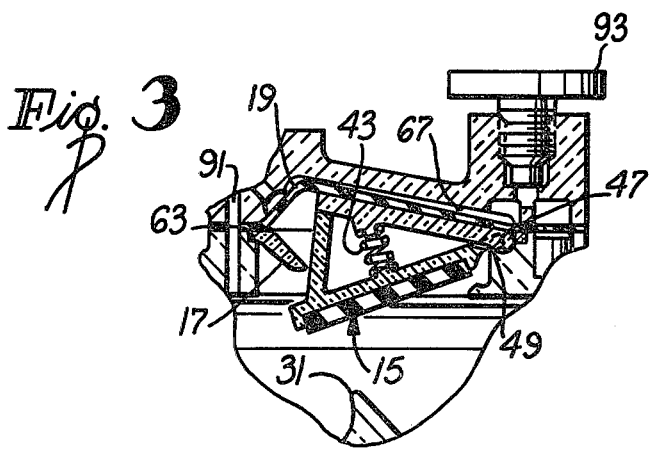

DIAPHRAGM VALVE

BACKGROUND OF THE INVENTION

Diaphragm operated valves are used to control the flow of various fluids, such as water, for many different purposes, including irrigation. A typical prior art diaphragm valve includes a valve housing and a linearly movable valve element for cooperating with a valve seat to control flow through the valve housing. The valve element is held closed by inlet water pressure which is supplied to a control chamber on one side of the valve element. To open the valve, the pressure in the control chamber is vented by a solenoid valve or other suitable means, and this allows inlet water pressure to open the valve.

One such diaphragm valve is shown in Hauser U.S. Pat. No. 3,591,126. A diaphragm valve in which the valve element pivots is shown in Rabal U.S. Pat. No. 2,686,034. Although the Hauser valve functions very satisfactorily, both of these valves are more complicated than desired in their construction and assembly. These factors contribute to increasing the cost of the valve. In addition, the pressure loss through both of these valves is relatively high in that the water must "bend" through essentially 180 degrees in moving through the valve. Although inclining of the valve seat with respect to the axis of the passage through the valve housing is known to reduce pressure loss, the problem of providing such a feature in combination with an easily assembled, relatively low-cost valve has not been solved.

SUMMARY OF THE INVENTION

This invention generally overcomes the problems discussed above in providing a diaphragm valve which is of simple, inexpensive construction and which can be easily assembled. In addition, the pressure drop through the valve is minimized by appropriately inclining the valve seat relative to the axis of the passage through the valve.

The valve of this invention includes a valve housing having a passage extending through it with the passage having an inlet and an outlet. The housing has a valve seat in the passage. To reduce pressure losses through the valve, the seat defines a plane which forms an acute angle with the axis of the passage. Accordingly, the fluid flowing through the passage need not "bend" through 180 degrees in passing through the valve.

To facilitate construction of the valve, the valve housing can advantageously include a valve body and a cover. The passage is contained in the valve body, and the valve body has an opening communicating via a cavity with the passage adjacent the valve seat. The cover is coupled to the valve body and it closes the opening.

To facilitate assembly, the internal components of the valve are sized to be received through the opening in the valve body. For example, the valve element can be inserted through the opening in the valve body into the valve. To further simplify construction and assembly, the valve element is mounted for pivotal movement in the valve body by pinless mounting means. Thus, no pins need to be inserted to pivotally mount the valve element. Rather, first and second pivotal mounting elements are carried by the valve element and the valve body, respectively, with these pivotal mounting elements being engageable to at least assist in pivotally mounting the valve element. One of the pivotal mounting means includes a projection, and the other includes a cooperating recess for defining a pivot axis.

In a preferred embodiment, the valve body has a recess opening toward the opening of the valve body so that it can receive a cooperating projection on the valve element. Of course, the projection and recess can be reversed, if desired. With this construction, the pivotal connection between the valve element and the valve body is obtained automatically in response to dropping the valve element through the opening in the valve body into the valve. Thus, proper insertion of the valve element automatically pivotally mounts the valve element.

To operate the valve element, a diaphragm extends across the cavity in the valve housing to define a control chamber on one side of the diaphragm with the other side of the diaphragm communicating with the passage through the valve. Passage means is provided in the valve housing leading to the control chamber so that the pressure in the control chamber can be varied to control the position of the diaphragm. For example, fluid at inlet pressure or pressurized fluid from some other source may be supplied through the passage means to the control chamber to act on the diaphragm. The diaphragm in turn exerts a force on the valve element tending to hold the valve element in the closed position. By venting the pressure in the control chamber utilizing, for example, a solenoid valve or manual means, the force of the fluid at inlet pressure acting on the valve element is sufficient to pivot the valve element to the open position.

To support the diaphragm when the latter is under pressure, a diaphragm support is provided in the cavity in the valve housing. To allow the diaphragm to urge the valve element toward the closed position, the diaphragm support has an opening for at least partially receiving the valve element. Preferably, the diaphragm support is in the form of an asymmetrical ring.

To facilitate assembly of the diaphragm support, the valve body has a mounting shoulder adjacent the opening in the valve body. The diaphragm support can be quickly and easily installed by dropping it through the opening onto the mounting shoulder. The diaphragm is also easily installed by clamping it between the valve body and the cover.

Although the valve element can be a single member, it preferably includes first and second sections engageable with the diaphragm and the valve seat, respectively, and resilient means for urging the sections away from each other. The resilient means initiates closing movement of the valve. Although this feature is not novel per se, this invention utilizes this feature to advantage at low pressures and low flows where valve closure with a pivotal valve element is sometimes difficult to initiate.

The invention, together with further features and advantages thereof, may best be understood by reference to the following description taken in connection with the accompanying illustrative drawing.

BRIEF DESCRIPTION OF THE DRAWING

FIG. 1 is a longitudinal sectional view taken through a valve constructed in accordance with the teachings of this invention with the valve element being in the closed position.

FIG. 1a is an enlarged fragmentary sectional view showing a portion of the structure of FIG. 1.

FIG. 2 is a sectional view taken generally along line 2—2 of FIG. 1 with the diaphragm removed.

FIG. 3 is a fragmentary sectional view similar to FIG. 1 showing the valve in the open position.

DESCRIPTION OF THE PREFERRED EMBODIMENT

FIGS. 1–3 show a diaphragm, valve 11 which generally includes a valve housing 13, a valve element 15, a diaphragm support 17 and a diaphragm 19. Although various different materials can be used, in the embodiment illustrated, the valve housing 13 is molded from a suitable plastic material. The valve housing 13 includes a valve body 21 and a cover 23. The valve body 21 has a straight, essentially cylindrical passage 25 extending completely through it from an inlet 27 to an outlet 29. The valve body 21 has a valve seat 31 of circular configuration in the passage 25. The passage 25 has a central or longitudinal axis 33, and the valve seat 31 lies in a plane which forms an acute angle relative to the axis 33. Although the magnitude of this acute angle can vary, in the embodiment illustrated, the angle is approximately 40 degrees.

The valve body has an opening 35 at the upper end of the valve body as viewed in FIG. 1. The opening 35 is sized so that the internal components of the valve can be passed through it for ease of assembly. The opening 35 is closed by the cover 23 which is releasably attached to the valve body in any suitable manner, such as by screws 37.

Although the valve element 15 can be a single unitary member, in the embodiment illustrated, it includes valve sections 39 and 41 and resilient means in the form of a spring 43 acting between the valve sections to urge them away from each other. A seal 45 is carried by the valve section 39 for engagement with the valve seat 31.

The valve element 15 is sized to be received through the opening 35 into the valve body 21. The valve element 15 is mounted on the valve body 21 for pivotal movement between a closed position in which the valve element engages the valve seat to essentially block the flow of fluid through the passage 25 from the inlet 27 to the outlet 29 and an open position in which the valve element is spaced from the valve seat (FIG. 3) to allow the flow of fluid through the passage from the inlet to the outlet. Although the valve element can be pivotally mounted on the valve body in different ways, it is preferred to utilize a pinless connection to accomplish this. In the embodiment illustrated, the pinless mounting means includes projections 47 on the valve sections 39 and 41 and a corresponding mating recess 49 on the valve body 21. The projections 47 on the valve sections 39 and 41 are staggered or interleaved as shown in FIG. 2. The recess 49 opens upwardly and the projections 47 project downwardly so that, during assembly, the valve element 15 can be simply dropped or inserted through the opening 35 into the valve body 21 and, by placing the projections 47 into the recess 49, the pivotal connection is automatically obtained. The recess 49 is formed integrally in the valve body 21 adjacent the upper end of the opening 35, and a lip 51 which defines a part of the recess 49 restrains the valve element 15 from falling out of the recess.

The diaphragm support 17 in the embodiment illustrated is in the form of an integral ring which has been molded from a suitable plastic material and which has a section 52 (FIG. 2) to accommodate the interleaved projections 47 so that the projections 47 can be received in the removed section 52. The diaphragm support 17 has an opening 53 sized to accommodate the valve element 15. The opening 53 has a center 55 and the outer periphery of the diaphragm support 17 has a center 57 displaced from the center 55 as shown in FIG. 2. Thus, the diaphragm support 17 is asymmetrical. The diaphragm support 17 includes a diaphragm supporting lip 59 of minimum depth and length adjacent the recess 49 and of maximum depth and length opposite the recess 49, with the depth of the lip progressively increasing from the recess 49. The lip 59 has a smooth, inner surface 61 of a generally conical configuration. For example, the diaphragm support 17 can be in the form of a cone which is truncated at an angle.

To facilitate assembly, the valve body 21 has an annular mounting shoulder 63 facing upwardly at the mouth of the opening 35. The diaphragm support 17 has a flange 65 adapted to rest on the mounting shoulder 63. Thus, during assembly, the diaphragm support 17 can be inserted through the opening and placed on the mounting shoulder 63.

The diaphragm 19 is preferably molded into the configuration shown in FIGS. 1 and 3. With this slack molded into the diaphragm, the diaphragm can move between the positions shown in FIGS. 1 and 3 without stretching or resiliently deforming. This minimizes the force required to move the valve element 15.

The diaphragm 19, which may be constructed of rubber or a suitable plastic, is sandwiched between the valve body 21 and the cover 23. The diaphragm 19 extends across the cavity in the valve housing 13 above the passage 25 to define a control chamber 67 on one side of the diaphragm with the other side of the diaphragm communicating with the passage 25. As shown in FIGS. 1 and 3, the central region of the diaphragm 19 engages the valve element 15.

By pressurizing the control chamber 67, the diaphragm 19 urges the valve element 15 toward the closed position. Similarly, by reducing the pressure in the control chamber, the force of fluid from the inlet 27 acting on the valve element 15 is sufficient to pivot the valve element 15 to the open position. Although the pressure in the control chamber 67 can be controlled in different ways, in the embodiment illustrated, the control chamber is provided with liquid from the inlet 27 through a restricted orifice 69 in the valve body 21 and a passage 71 in the cover 23. The area of the diaphragm 19 exposed to inlet pressure in the control chamber 67 is greater than the area of the valve element 15 exposed to inlet pressure. Consequently, the valve element 15 is held in the closed position.

It is important that the orifice 69 be very small. In fact, the orifice 69 must be so small that it cannot be readily molded into the valve body 21. With this invention, a tubular cartridge 73 is provided with an opening 75, and a pin with enlarged heads 79 and a smaller diameter shank 81 is provided in the opening. The pin reduces the open area of the opening 75 to define the small cross-sectional area orifice 69.

For assembly purposes, the pin 77 with at least one of the heads 79 removed can first be inserted through the opening 75 and thereafter the second of the heads 79 can be attached or formed integrally with the pin by expanding the end portion of the pin. The cartridge 73 with the pin 77 therein can then be dropped into an upwardly opening bore 83 in the valve body 21. The upper end of the cartridge 73 terminates flush with the valve body 21.

To permit the valve element 15 to move to the open position, the pressure in the control chamber 67 must be reduced. According to the specific embodiment illustrated, this is accomplished by a solenoid valve 85. With the solenoid valve de-energized, a plunger 87 engages a valve seat 89 formed in a passage 91 leading from the control chamber 67 to the passage 25 on the downstream side of the valve element 15. By energizing the solenoid valve 85, the plunger 87 is moved off the valve seat 89 to allow the fluid under pressure in the control chamber 67 to be vented to the outlet 29. Because the orifice 69 has a small cross-sectional area, fluid from the inlet 27 cannot be supplied at a sufficiently rapid rate to replenish the fluid loss and, consequently, the fluid at inlet pressure acting on the valve element 15 is sufficient to move the valve element 15 to the open position shown in FIG. 3.

The pressure in the control chamber 67 can be manually reduced by loosening a screw 93 which is threaded into a boss 95 of the cover 23. When the screw 93 is tight, it holds a seal 97 against a valve seat 99 in the passage 71. By loosening the screw 93, the liquid under pressure in the control chamber 67 can pass out through the valve seat 99 and between the threads of the screw 99 in the boss 95. This can be useful for manual control of the valve or if the solenoid should fail to operate for any reason.

The operation of the diaphragm valve 11 and its assembly should be apparent from the foregoing. It should be noted, however, that for low-fluid pressures and low-flow rates, opening of the control chamber to outlet pressure may not be sufficient to initiate movement of the valve element toward the closed position. With this invention, however, the force of the spring 43 adds to the force of the pressure in the control chamber 67 to provide the necessary starting impetus for the valve section 39 back toward the closed position.

Although an exemplary embodiment of the invention has been shown and described, many changes, modifications and substitutions may be made by one having ordinary skill in the art without necessarily departing from the spirit and scope of this invention.

I claim:

1. A valve comprising:
   a valve housing having a passage extending therethrough, said passage having an inlet and an outlet and a longitudinal axis, said housing having a valve seat in said passage, said valve seat defining a plane which forms an acute angle with said axis, and said valve housing having a cavity communicating with said passage;
   a movable diaphragm extending across said cavity to define a control chamber on one side of the diaphragm, the other side of the diaphragm communicating with the passage;
   control means for varying the pressure in the control chamber to tend to control the position of the diaphragm, said control means including passage means in said valve housing leading to said control chamber;
   a diaphragm support having an opening therein;
   means for mounting said diaphragm support so that the diaphragm support can at least partially support the diaphragm on said other side of the diaphragm in a predetermined position of the diaphragm;
   a valve element;
   means for pivotally mounting the valve element on the valve housing for pivotal movement relative to said diaphragm support between a closed position in which the valve element engages the valve seat to essentially block the flow of fluid through the passage from the inlet to the outlet and an open position in which the valve element is spaced from the valve seat to allow the flow of fluid through the passage from the inlet to the outlet; and
   said diaphragm acting through said opening in said diaphragm support to urge the valve element toward the closed position when the pressure in the control chamber is sufficient and said valve element being movable to said open position by fluid from the inlet acting on said valve element when the pressure in the control chamber is reduced by said control means.

2. A valve as defined in claim 1 wherein said diaphragm support includes an asymmetrical ring-like member.

3. A valve as defined in claim 2 wherein said diaphragm support includes a ring-like member with a generally conical surface for supporting said other side of said diaphragm, said conical surface being truncated at an angle.

4. A valve as defined in claim 1 wherein said valve element pivots about a pivotal axis and said pivotal mounting means includes a projection carried by one of the valve element and the valve housing and a cooperating recess carried by the other of the valve element and the valve housing, said projection being received within said recess to define the pivotal axis.

5. A valve as defined in claim 1 wherein said valve element includes first and second sections engagement with said diaphragm and said valve seat, respectively, and resilient means for urging said sections away from each other.

6. A valve as defined in claim 1 wherein said diaphragm support is a separate member and said diaphragm support mounting means includes a shoulder in said cavity for supporting said diaphragm support.

7. A valve as defined in claim 1 wherein said valve housing includes a valve body having said passage extending therethrough and an opening communicating via said cavity with said passage adjacent said valve seat and a cover coupled to said valve body for closing said opening, said diaphragm being clamped between said valve body and said cover.

8. A valve as defined in claim 7 wherein said diaphragm support mounting means includes a mounting shoulder in said valve body, said diaphragm support being positioned on said mounting shoulder contiguous said diaphragm, said diaphragm support including an asymmetrical ring for at least partially receiving the valve element in at least certain positions of said valve element.

9. A valve as defined in claim 7 wherein said passage means includes a bore in said valve body opening at said cover and at said passage, and orifice means insertable into said bore for defining a restricted orifice in said passage means.

10. A valve as defined in claim 1 wherein sad diaphragm and said valve element are drivingly disconnected in a direction toward the control chamber whereby the diaphragm does not pull the valve element when the diaphragm moves toward the control chamber.

* * * * *